Figure 1:
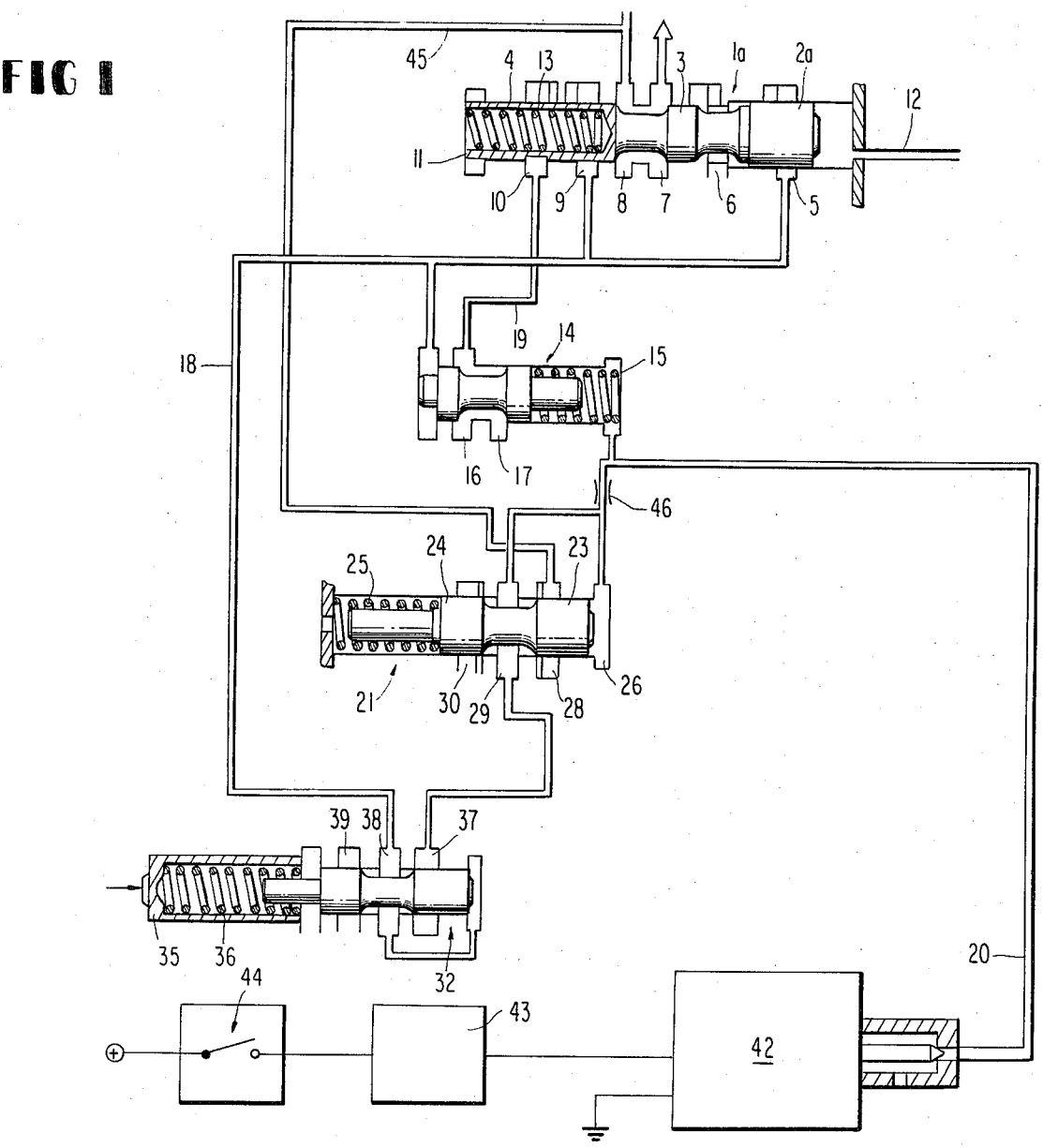

United States Patent [19]

Gaus

[11] 4,369,676

[45] Jan. 25, 1983

[54] KICK-DOWN CIRCUIT FOR AUTOMATIC CHANGE-SPEED TRANSMISSIONS

[75] Inventor: Hermann Gaus, Stuttgart, Fed. Rep. of Germany

[73] Assignee: Daimler-Benz Aktiengesellschaft, Stuttgart, Fed. Rep. of Germany

[21] Appl. No.: 169,520

[22] Filed: Jul. 21, 1980

[30] Foreign Application Priority Data

Jul. 21, 1979 [DE] Fed. Rep. of Germany ....... 2929573

[51] Int. Cl.³ .......................................... B60K 41/10
[52] U.S. Cl. ...................................... 74/868; 74/867; 74/870; 74/877; 74/865
[58] Field of Search ................. 74/869, 843, 856, 861, 74/862, 865, 868, 870, 877

[56] References Cited

U.S. PATENT DOCUMENTS

| | | | |
|---|---|---|---|
| 2,118,978 | 5/1938 | Maybach | 74/870 X |
| 2,857,780 | 10/1958 | Ball et al. | 74/870 |
| 2,971,405 | 2/1961 | Flinn | 74/869 X |
| 3,023,632 | 3/1962 | Flinn | 74/869 X |
| 3,080,768 | 3/1963 | Jania | 74/781 R X |
| 3,117,464 | 1/1964 | Ivey | 74/869 |
| 3,561,293 | 2/1971 | Fujita et al. | 74/869 |
| 3,613,484 | 10/1971 | Pierce et al. | 74/869 |
| 3,667,323 | 6/1972 | Iric | 74/869 X |
| 3,709,064 | 1/1973 | Schaefer et al. | 74/869 X |
| 3,783,713 | 1/1974 | Will | 74/869 X |
| 3,785,224 | 1/1974 | Will | 74/867 X |
| 3,943,799 | 3/1976 | Sakai | 74/869 X |
| 4,020,718 | 5/1977 | Miyauchi et al. | 74/869 |
| 4,134,312 | 1/1979 | Iijima | 74/868 |
| 4,186,627 | 2/1980 | Kuramochi | 74/869 |

FOREIGN PATENT DOCUMENTS

| | | | |
|---|---|---|---|
| 565317 | 10/1958 | Canada | 74/870 |
| 696226 | 9/1940 | Fed. Rep. of Germany | 74/870 |

*Primary Examiner*—Leslie A. Braun
*Attorney, Agent, or Firm*—Paul M. Craig, Jr.

[57] ABSTRACT

A kick-down circuit for an automatic change-speed transmission with a kick-down control member transmitting a kick-down control signal when an accelerator or gas pedal is floored and with at least one gearshift control element operating in dependence upon a transmission output speed and a position of the gas pedal for an auxiliary operating force of a shift actuating member participating in a shifting between a higher gear and a lower gear. The gearshift control element, upon an occurrence of the kick-down control signal, may be brought into its position for the lower gear under the effect of an auxiliary control force dependent upon a position of the gas pedal. The kick-down control signal is temporally limited independently of the position of the gas pedal.

8 Claims, 2 Drawing Figures

KICK-DOWN CIRCUIT FOR AUTOMATIC CHANGE-SPEED TRANSMISSIONS

The present invention relates to an automatic transmission and, more particularly, to a kick-down circuit for an automatic change-speed transmission.

In, for example, U.S. Pat. No. 3,080,768, a kick-down circuit for an automatic change-speed transmission is proposed which includes a kick-down control member for transmitting the kick-down control signal when a gas pedal or accelerator of the vehicle is "floored" and at least one gearshift control element operating in dependence upon an output speed of the transmission and a position of the accelerator for an auxiliary operating force of a shifting between a higher gear and a lower gear, and wherein a gearshift control element, upon an occurrence of the kick-down control signal, may be brought into a position for the lower gear under the effect of an auxiliary control force dependent upon the position of the gas pedal.

A disadvantage of the aforementioned proposed construction resides in the fact that there is a delay in an initiation of the downshifting following the kick-down signal. This delay effect takes place at driving speeds which are near the limit speed at which downshifting operations are just barely still possible. The cause of this delay is that an oil pressure dependent on the driving speed and an oil pressure dependent on the position of the gas pedal act against each other on an end face of a gearshift valve. Near to the limit of the downshifting speed, excess forces at the gearshift valve, in a direction toward downshifting, become very small so that the valve body of the gearshift valve moves correspondingly slowly such that a driver of the vehicle may sense as a delay the time interval from operation of the kick-down switch to an opening of control edges of the gearshift valve at the beginning of the downshifting operation.

The aim underlying the present invention essentially resides in providing a kick-down circuit for an automatic change-speed transmission which avoids a delay in downshifting operations following an operation of the kick-down switch.

In accordance with advantageous features of the present invention, a kick-down control signal, for example, a signal through a control pressure line is temporally limited independently of a position of the accelerator or a kick-down switch.

By virtue of the features of the present invention, the kick-down control signal acting on the gearshift valve in a downshifting direction is effective only for a brief predetermined time period. If excess force at the gearshift valve is so large that the control edges are opened during this time period, then a downshifting operation will occur; however, if the excess force is too small, then the valve body of the gearshift valve returns into a starting position after an elapse of a predetermined time period and the downshifting operation is not carried out.

Advantageously, in accordance with the present invention, the predetermined time period is selected so that it is just short of being perceived by the driver of the vehicle as a delay in the initiation of the downshifting operation.

In accordance with a further feature of the present invention, the kick-down control signal, for example, a kick-down control pressure through a pressure line is pulsed. Advantageously, the kick-down control member is influenced by a precontrol element controlled by the accelerator or kick-down switch and operating in dependence upon time.

Accordingly, it is an object of the present invention to provide a kick-down circuit for an automatic change-speed transmission which avoids, by simple means, shortcomings and disadvantages encountered in the prior art.

Another object of the present invention resides in providing a kick-down circuit for automatic change-speed transmissions which minimizes a delay in the initiation of downshifting operations of the transmission following a receipt of a kick-down signal.

Yet another object of the present invention resides in providing a kick-down circuit for automatic change-speed transmissions which prevents a carrying out of a downshifting operation if predetermined forces acting on a valve body of a valve gearshift means do not exist after an elapse of a predetermined time period.

A further object of the present invention resides in providing a kick-down circuit for automatic change-speed transmissions which is simple in construction and therefore relatively inexpensive to manufacture.

Yet another object of the present invention resides in providing a kick-down circuit for automatic change-speed transmissions which functions reliably under all operating conditions.

Figure 2:
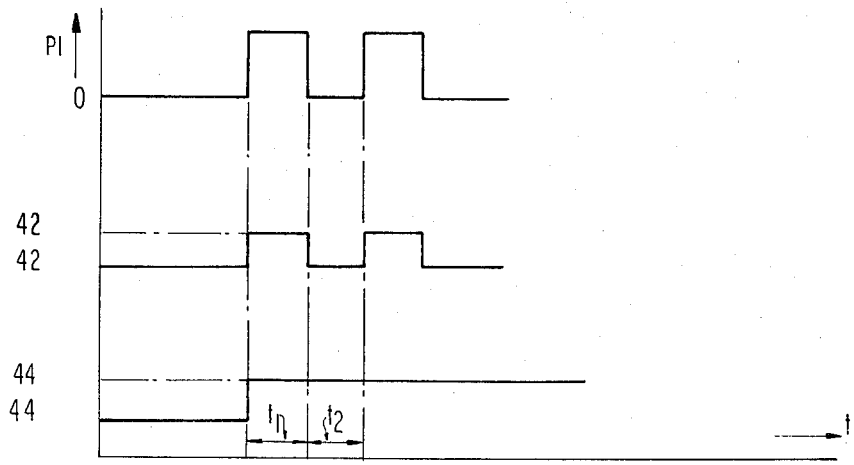

These and other objects, features, and advantages of the present invention will become more obvious from the following description when taken in connection with the accompanying drawings which show, for the purposes of illustration only, one embodiment of a kick-down circuit for an automatic change-speed transmission in accordance with the present invention, and wherein:

FIG. 1 is a schematic switching diagram of a kick-down circuit in accordance with the present invention; and FIG. 2 is a graphical illustration of a time diagram for the kick-down control signal in the kick-down circuit of FIG. 1.

Referring now to the drawings wherein like reference numerals are used in both views to designate like parts and, more particularly, to FIG. 1, according to this figure, a gearshift valve generally designated by the reference numeral 1a is provided with control collars 2a, 3, and 4 as well as with control recesses 5, 6, 7, 8, 9, and 10, and a compression spring 11. The control collar 2a is larger in diameter than the control collars 3, 4. In FIG. 1, the gearshift valve 1a is illustrated in the "upshifted" position. A control pressure of a control pressure line 12, dependent upon a driving speed of the vehicle in which the change-speed transmission is disposed, acts on a right-hand end face of the valve. The control recesses 5 and 9 are connected to a control pressure line 18 under a control pressure dependent upon a position of a gas pedal or accelerator (not shown); whereas, the recess 8 is in communication with a main line 45 under an operating pressure. The recess 7 is in communication with a shift actuating member (not shown) to be acted upon and the recess 6 is in communication with an oil sump (not shown).

The left-hand end face of the control valve 1a forms the spring side thereof and is connected through a transverse bore 13 and through a control recess 10 with a control recess 16 of a precontrol valve generally designated by the reference numeral 14 through a connecting line or conduit 19. The precontrol valve 14 is provided with a compression spring 15 and a further control recess 17.

A left-hand end face of the precontrol valve 14 is connected to the control pressure line 18 which is under the control pressure dependent upon a position of the accelerator or gas pedal; whereas, a right-hand end face of the precontrol valve 14 is acted upon by a compression spring 15 and is connected through a kick-down control pressure line 20 to a conventional kick-down solenoid valve 42.

In a left shifting position, the recess 16 is relieved through the recess 17 to the oil sump; whereas, in a right shifting position, the recess 16 is connected with the control pressure line 18.

A control valve generally designated by the reference numeral 21 is provided with control collars 23, 24, a compression spring 25, and control recesses 26, 28, 29 and 30. The control valve 21 acts as a pressure-reducing valve and the recess 28 is connected to a main line 45 with the recess 30 being connected with the oil sump.

The pressure, regulated so as to be at a constant value, passes through the recess 29 to a control valve generally designated by the reference numeral 32 for the control pressure dependent upon the position of the gas pedal, to the recess 26 at an end-face side of the control valve 21, and through a throttle 46 to the kick-down control pressure line 20. Oil pressure acting on the right-hand end face of the control valve 21 works against the compression spring 25.

The control valve 32 for the control pressure dependent upon the position of the gas pedal includes a piston 35 and a compression spring 36. Depending upon a position of the gas pedal, the compression spring 36 is more or less pretensioned by shifting of the piston 35, and an oil pressure proportional to the spring force is regulated in a control recess 38 of the control valve 32.

During a full throttle and kick-down, the control recess 38 is cut off from a control recess 39 connected to the oil sump and is exclusively connected to a control recess 37 wherein a constant pressure is ambient which is regulated by the control valve 21 through the recess 29.

The kick-down solenoid valve 42 switches the line 20 and thus the right-hand end face of the precontrol valve 14 so that they are without pressure. This has the effect that the precontrol valve 14 enters its right-hand end position and connects the left-hand end face of the gearshift valve 1a with the oil pressure in the line 18 controlled by the control valve 21.

In this end position of the valve 14, the force acting on the left-hand end face against the oil pressure dependent upon the driving speed of the vehicle is thus increased at the gearshift valve 1a. If the gearshift valve 1a is moved so far that the control collar 2a opens the control recess 5 and the control collar 3 closes the recess 6, then the valve body of the gearshift valve 1a is moved completely toward the right in a downshift position by the oil pressure of the line 18 which now also acts on a differential surface area between the recesses 2a and 3.

The kick-down solenoid valve 42 is switched in a pulsating fashion by means of a conventional timer switch 43. After an operation of a kick-down switch 44 located beneath the gas pedal, the electric circuit for the solenoid valve 42 is closed by the timer switch 43 only for a brief predetermined time period $t_1$ (FIG. 2), then is interrupted for a second predetermined time period $t_2$ before the circuit is again closed for the time period $t_1$. As shown most clearly in FIG. 2, this procedure continues as long as the kick-down switch 44 is operating. The result of this procedure is that the precontrol valve 14 switches in the same rhythm as the oil pressure controlled by the control valve 21 in the line 18 to the left-hand end face of the gearshift valve 1a. In other words, the oil pressure with a downshifting action is present on the left-hand side of the gearshift valve 1a only during the time period $t_1$. If the excess force as compared with the oil pressure dependent upon the driving speed of the vehicle is so large that, during this time period $t_1$, the control collar 2a opens the control recess 5, or the collar 3 closes the recess 6 and then the gearshift valve 1a jumps completely into its end position and the downward shifting of the change-speed transmission takes place.

If the distance traversed by the valve body of the gearshift valve 1a in the time period $t_1$ is too small to respectively open and close the control recesses, then the valve body of the gearshift valve 1a returns into its starting position during the time period $t_2$. This play or procedure is repeated until either the kick-down switch 44 is opened again or, when during a reduction in a driving speed of the vehicle, the excess force is in a direction toward downshifting has become so large that the valve movement required for the downshifting is executed within the predetermined time period $t_1$ provided for this purpose.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such changes and modifications as are encompassed by the scope of the appended claims.

I claim:

1. A kick-down circuit for an automatic change-speed transmission, the circuit including a kick-down control means for transmitting a kick-down control signal when an accelerator pedal of the vehicle in which the transmission is installed is depressed to a predetermined position, characterized in that means are provided for limiting a duration of the kick-down control signal for a predetermined time period independently of a position of the accelerator pedal.

2. A kick-down circuit according to claim 1, characterized in that the circuit further includes at least one gearshift control element operable in dependence upon an output speed of the transmission and a position of the accelerator pedal for generating an auxiliary operating force of a shift actuating member shiftable between a higher gear and a lower gear, and in that the gearshift control element is adapted to be brought into a position for the lower gear under the effect of an auxiliary control force dependent upon a position of the accelerator pedal upon an occurrence of the kick-down control signal.

3. A kick-down circuit according to one of claims 1 or 2, characterized in that the limiting means is adapted to pulsate the kick-down control signal.

4. A kick-down circuit according to claim 1, characterized in that said limiting means includes a precontrol element operatively connected to the kick-down control means, and in that the precontrol element is controlled by the accelerator pedal and operates in dependence upon time.

5. A kick-down circuit according to claim 1, characterized in that the circuit further includes a gearshift valve means operable in dependence upon an output speed of the transmission and a position of the accelerator pedal, a precontrol valve operatively connected with the gearshift valve means and the kick-down control means, a first control valve operatively connected with the gearshift valve means, precontrol valve, and kick-down control member, and a further control valve operatively connected to the first control valve and the gearshift valve means.

6. A kick-down circuit according to claim 5, characterized in that the gearshift valve means includes a displaceable valve body, a compression spring means for normally biasing the valve body means in a downshifting direction, and a plurality of control recesses respectively communicating with control recesses of the precontrol valve, first control valve, and said second control valve in dependence upon a positioning of the displaceable valve body means, and in that a control pressure line is provided for operatively connecting the control valve with said precontrol valve and said kick-down control means.

7. A kick-down circuit according to one of claims 1, 5, or 6, characterized in that the kick-down control means is a solenoid valve, and in that the limiting means is a timer switch connected to the solenoid valve, said timer switch is adapted to pulse the kick-down control signal.

8. A kick-down circuit according to claim 1, wherein the means for limiting duration of the kick-down control signal comprises a means for pulsing the kick-down control signal.

* * * * *